(12) United States Patent
Wang et al.

(10) Patent No.: US 11,982,341 B2
(45) Date of Patent: May 14, 2024

(54) POWER SPLIT TRANSMISSION SYSTEM AND VEHICLE

(71) Applicants: WEICHAI POWER CO., LTD., Shandong (CN); LINDE HYDRAULICS (CHINA) CO., LTD., Shandong (CN)

(72) Inventors: Dongkun Wang, Shandong (CN); Minghui Zhou, Shandong (CN); Bin Qi, Shandong (CN); Yan Chen, Shandong (CN)

(73) Assignees: WEICHAI POWER CO., LTD, Shandong (CN); LINDE HYDRAULICS (CHINA) CO., LTD., Shandong (CN)

( * ) Notice: Subject to any disclaimer, the term of this patent is extended or adjusted under 35 U.S.C. 154(b) by 0 days.

(21) Appl. No.: 18/037,928

(22) PCT Filed: Dec. 4, 2020

(86) PCT No.: PCT/CN2020/133957
§ 371 (c)(1),
(2) Date: May 19, 2023

(87) PCT Pub. No.: WO2022/077736
PCT Pub. Date: Apr. 21, 2022

(65) Prior Publication Data
US 2024/0003415 A1   Jan. 4, 2024

(30) Foreign Application Priority Data

Oct. 12, 2020   (CN) .......................... 202022256946.8

(51) Int. Cl.
*F16H 47/04*   (2006.01)
*F16H 37/06*   (2006.01)
*F16H 37/04*   (2006.01)

(52) U.S. Cl.
CPC .......... *F16H 47/04* (2013.01); *F16H 37/065* (2013.01); *F16H 2037/048* (2013.01);
(Continued)

(58) Field of Classification Search
CPC ............. F16H 47/04; F16H 2200/0039; F16H 2200/0086; F16H 2200/201;
(Continued)

(56) References Cited

U.S. PATENT DOCUMENTS

| 4,754,664 A * | 7/1988 | Dick ....................... F16H 47/04 475/81 |
| 5,156,577 A | 10/1992 | Frediksen et al. |

(Continued)

FOREIGN PATENT DOCUMENTS

| CN | 106369136 A | 2/2017 |
| CN | 108825746 A | 11/2018 |

(Continued)

OTHER PUBLICATIONS

International Search Report dated Jul. 8, 2021 in International Application No. PCT/CN2020/133957, pp. 1-4.

*Primary Examiner* — Roger L Pang
(74) *Attorney, Agent, or Firm* — Byrne Poh LLP

(57) ABSTRACT

A hydrostatic transmission mechanism of the power split transmission system is in driving connection to the sun gear of the first planetary gear train and the sun gear of the second planetary gear train. The planetary carrier of the first planetary gear train is connected to the planetary carrier of the second planetary gear train. The planetary carrier of the first planetary gear train is connected to the sun gear of a third planetary gear train. The driving plate of a third clutch is in transmission connection to the gear ring of the third planetary gear train. The driving plate of a fourth clutch is in transmission connection to the sun gear of the third plan- (Continued)

etary gear train. Each of the driven plate of the third clutch and the driven plate of the fourth clutch is connected to an output main shaft.

9 Claims, 1 Drawing Sheet

(52) U.S. Cl.
CPC ............... *F16H 2037/049* (2013.01); *F16H 2200/0039* (2013.01); *F16H 2200/0086* (2013.01); *F16H 2200/201* (2013.01); *F16H 2200/2043* (2013.01)

(58) Field of Classification Search
CPC ........... F16H 2200/2043; F16H 37/065; F16H 2037/048; F16H 2037/049
USPC ............................... 475/72, 80, 83, 317, 319
See application file for complete search history.

(56) References Cited

U.S. PATENT DOCUMENTS

| | | | | |
|---|---|---|---|---|
| 5,890,981 A | * | 4/1999 | Coutant | ............... F16H 47/04 475/74 |
| 6,056,657 A | * | 5/2000 | Garnett | ............... B60W 10/103 475/72 |

FOREIGN PATENT DOCUMENTS

| | | |
|---|---|---|
| CN | 109058403 A | 12/2018 |
| CN | 110056634 A | 7/2019 |
| DE | 4236671 C1 | 11/1993 |

\* cited by examiner

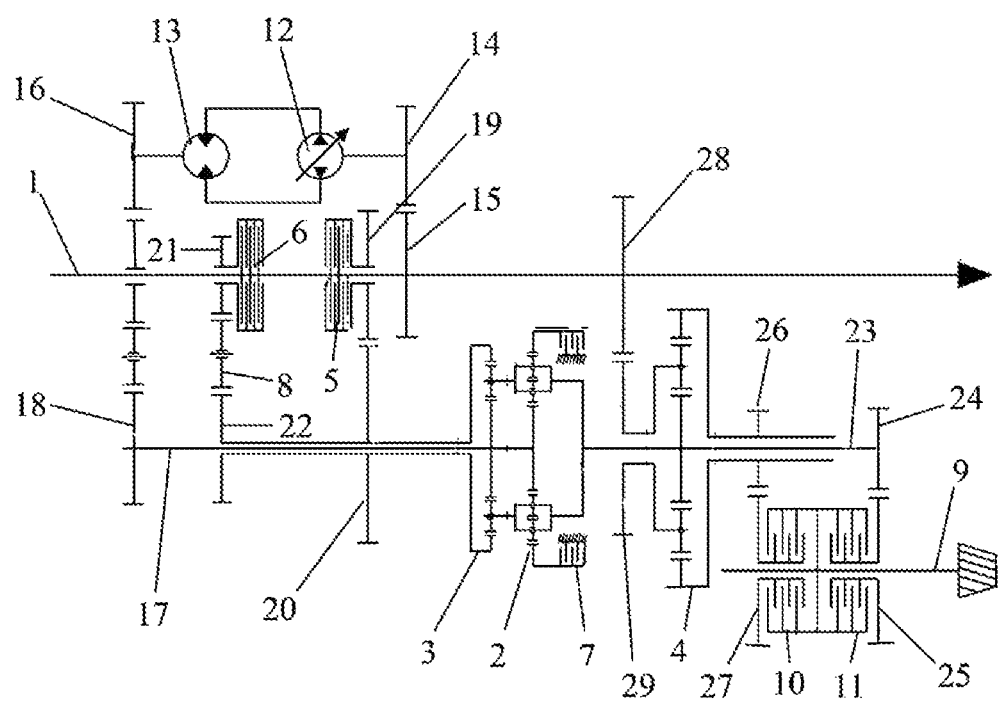

POWER SPLIT TRANSMISSION SYSTEM AND VEHICLE

CROSS-REFERENCE TO RELATED APPLICATIONS

This is a national stage application filed under 35 U.S.C. § 371 based on International Patent Application No. PCT/CN2020/133957, filed Dec. 4, 2020, which claims priority to Chinese Patent Application No. 202022256946.8 filed with the China National Intellectual Property Administration (CNIPA) on Oct. 12, 2020, the disclosures of which are hereby incorporated by reference herein in their entireties.

TECHNICAL FIELD

The present application relates to the field of transmission device technology, for example, a power split transmission system and a vehicle.

BACKGROUND

A gearbox is one of the core components of a tractor. At present, tractors in China mainly adopt manual shift gearboxes, power shift gearboxes are rare, and mechanical hydraulic power split continuously variable gearboxes are even rarer.

In a mechanical hydraulic power split continuously variable gearbox, a mechanical hydraulic power split transmission mode is adopted, which can ensure that an engine changes a vehicle speed at a constant rotational speed by adjusting the output rotational speed of a hydrostatic transmission mechanism. At the same time, since the hydrostatic transmission mechanism is controlled in proportion, the output rotational speed of the hydrostatic transmission mechanism can vary continuously from zero to the maximum. In this manner, the output rotational speed formed, at a planetary mechanism, by the confluence of the output rotational speed of the hydrostatic transmission mechanism and the output rotational speed of the engine can also vary continuously from zero to the maximum. Thus, a mechanical hydraulic power split continuously variable gearbox is superior to a manual shift gearbox and a power shift gearbox. A vehicle can smoothly start when an engine operates at a low speed, and the driving comfort is improved. At the same time, a tractor adopting the transmission route can ensure continuous power output under an operation condition, and there is no torque instability or interruption during acceleration and deceleration, thereby improving the operation efficiency and operation quality. However, when the transmission structure of the existing mechanical hydraulic power split continuously variable gearbox shifts gears, for example, when a low gear is shifted to a higher gear, the change in a transmission ratio is excessively large. To satisfy a transmission ratio requirement, it is generally necessary to adjust the swinging angle of a hydraulic pump in a hydrostatic transmission mechanism in a large range, thereby increasing the shift time for shifting gears.

SUMMARY

The present application provides a power split transmission system that can reduce the range of the swinging angle of a hydraulic pump in a hydrostatic transmission mechanism during gear shifting, thereby reducing the shift time.

An embodiment provides a power split transmission system. The system includes a hydrostatic transmission mechanism, an input main shaft, a first planetary gear train, a second planetary gear train, a third planetary gear train, a reverse gear, a first clutch, a second clutch, a brake, an output main shaft, a third clutch, and a fourth clutch.

The input main shaft is in transmission connection to the input terminal of the hydrostatic transmission mechanism.

The output terminal of the hydrostatic transmission mechanism is in driving connection to the sun gear of the first planetary gear train and the sun gear of the second planetary gear train. The planetary carrier of the first planetary gear train is coaxially fixed to the planetary carrier of the second planetary gear train. The planetary carrier of the first planetary gear train is coaxially fixed to the sun gear of the third planetary gear train. The planetary carrier of the third planetary gear train is in transmission connection to the gear of the input main shaft.

The first clutch can make the input main shaft in transmission connection to the gear ring of the second planetary gear train to drive the gear ring of the second planetary gear train to rotate forward. The second clutch can make the input main shaft in transmission connection to the gear ring of the second planetary gear train through the reverse gear to drive the gear ring of the second planetary gear train to rotate reversely. The brake is connected to the gear ring of the first planetary gear train to control locking of the gear ring of the first planetary gear train.

The driving plate of the third clutch is in transmission connection to the gear ring of the third planetary gear train. The driving plate of the fourth clutch is in transmission connection to the sun gear of the third planetary gear train. Each of the driven plate of the third clutch and the driven plate of the fourth clutch is coaxially fixed to the output main shaft.

An embodiment provides a vehicle including the power split transmission system described above.

BRIEF DESCRIPTION OF DRAWINGS

FIG. 1 is a schematic diagram of a power split transmission system according to the present application.

REFERENCE LIST 1 input main shaft
2 first planetary gear train
3 second planetary gear train
4 third planetary gear train
5 first clutch
6 second clutch
7 brake
8 reverse gear
9 output main shaft
10 third clutch
11 fourth clutch
12 hydraulic pump
13 constant displacement motor
14 first gear
15 second gear
16 third gear
17 first sun gear axle
18 fourth gear
19 fifth gear
20 sixth gear
21 seventh gear
22 eighth gear
23 second sun gear axle
24 ninth gear 25 tenth gear
26 eleventh gear
27 twelfth gear
28 thirteenth gear
29 fourteenth gear

DETAILED DESCRIPTION

In the description of the present application, unless otherwise expressly specified and limited, the term "connected to each other", "connected" or "fixed" is to be construed in a broad sense, for example, as fixedly connected, detachably connected, or integrated; mechanically connected or electrically connected; directly connected to each other or indirectly connected to each other via an intermediary; or internally connected between two elements or interaction relations between two elements. For those of ordinary skill in the art, specific meanings of the preceding terms in the present application may be construed according to specific circumstances.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of embodiments, it is to be noted that orientations or position relations indicated by terms such as "above", "below", "left" and "right" are based on the drawings. These orientations or position relations are intended only to facilitate the description and simplify an operation and not to indicate or imply that a device or element referred to must have such particular orientations or must be configured or operated in such particular orientations. Thus, these orientations or position relations are not to be construed as limiting the present application. In addition, the terms "first" and "second" are used only to distinguish between descriptions and have no special meaning.

As shown in FIG. 1, an embodiment provides a power split transmission system and a vehicle having the power split transmission system. The system includes a hydrostatic transmission mechanism, an input main shaft 1, a first planetary gear train 2, a second planetary gear train 3, a third planetary gear train 4, a first clutch 5, a second clutch 6, a brake 7, a reverse gear 8, an output main shaft 9, a third clutch 10, and a fourth clutch 11. In this embodiment, the first planetary gear train 2, the second planetary gear train 3, and the third planetary gear train 4 are coaxially arranged side by side. The first planetary gear train 2 is located between the second planetary gear train 3 and the third planetary gear train 4. An engine (not shown) is connected to the input main shaft 1 for power input. The input main shaft 1 is in transmission connection to the input terminal of the hydrostatic transmission mechanism. The output terminal of the hydrostatic transmission mechanism is in driving connection to the sun gear of the first planetary gear train 2 and the sun gear of the second planetary gear train 3, and the first planetary gear train 2 and the second planetary gear train 3 are driven by hydraulic power. The planetary carrier of the first planetary gear train 2 is coaxially fixed to the planetary carrier of the second planetary gear train 3. The planetary carrier of the first planetary gear train 2 is coaxially fixed to the sun gear of the third planetary gear train 4. The planetary carrier of the third planetary gear train 4 is in transmission connection to the gear of the input main shaft 1. The first clutch 5 can make the input main shaft 1 in transmission connection to the gear ring of the second planetary gear train 3 to drive the gear ring of the second planetary gear train 3 to rotate forward. In this embodiment, the driving plate of the first clutch 5 is coaxially fixed to the input main shaft 1. The driven plate of the first clutch 5 coaxially sleeves on the input main shaft 1. The driven plate of the first clutch 5 is coaxially fixed to a fifth gear 19. The gear ring of the second planetary gear train 3 is coaxially fixed to a sixth gear 20. The sixth gear 20 meshes with the fifth gear 19. In this manner, the gear ring of the second planetary gear train 3 rotates forward. The second clutch 6 can make the input main shaft 1 in transmission connection to the gear ring of the second planetary gear train 3 through the reverse gear 8 to drive the gear ring of the second planetary gear train 3 to rotate reversely. In this embodiment, the driving plate of the second clutch 6 is coaxially fixed to the input main shaft 1. The driven plate of the second clutch 6 coaxially sleeves on the input main shaft 1. The driven plate of the second clutch 6 is coaxially fixed to a seventh gear 21. The gear ring of the second planetary gear train 3 is further coaxially fixed to an eighth gear 22. The seventh gear 21 meshes with the eighth gear 22 through the reverse gear 8. In this manner, the gear ring of the second planetary gear train 3 rotates reversely. The brake 7 is connected to the gear ring of the first planetary gear train 2 to control locking of the gear ring of the first planetary gear train 2. In this embodiment, the driving plate of the brake 7 is coaxially fixed to the gear ring of the first planetary gear train 2, and the driven plate of the brake 7 is in fixed connection to a brake holder (not shown) to limit rotation of the gear ring of the first planetary gear train 2 when the driving plate of the brake 7 and the driven plate of the brake 7 are closed. The driving plate of the third clutch 10 is in transmission connection to the gear ring of the third planetary gear train 4. The driving plate of the fourth clutch 11 is in transmission connection to the sun gear of the third planetary gear train 4. Each of the driven plate of the third clutch 10 and the driven plate of the fourth clutch 11 is coaxially fixed to the output main shaft 9.

In this embodiment, the power split transmission system can provide three forward gear ratios and two reverse gear ratios during actual operation, including, for example, a first reverse gear ratio, a second reverse gear ratio, a first forward gear ratio, a second forward gear ratio, and a third forward gear ratio. A rotational speed gradually increases from the first forward gear ratio to the third forward gear ratio positively. The rotational speed gradually increases from the first reverse gear ratio to the second reverse gear ratio in reverse.

In a first reverse gear ratio state, the brake 7 and the fourth clutch 11 are closed, and the first clutch 5, the second clutch 6, and the third clutch 10 are disengaged. The input main shaft 1 drives the hydrostatic transmission mechanism to operate. The hydrostatic transmission mechanism converts mechanical energy into hydraulic energy, then transfers kinetic energy to the sun gear of the first planetary gear train 2, and then transfers the kinetic energy to the sun gear of the third planetary gear train 4 through the planetary carrier of the first planetary gear train 2. Further, the sun gear of the third planetary gear train 4 drives the driving plate of the fourth clutch 11 to rotate through a transmission gear. The driving plate of the fourth clutch 11 drives the driven plate of the meshed fourth clutch 11 to rotate. Finally, the output main shaft 9 is driven to rotate. In this manner, the power output of the first reverse gear ratio is implemented.

In a second reverse gear ratio state, the second clutch 6 and the fourth clutch 11 are closed, and the first clutch 5, the brake 7, and the third clutch 10 are disengaged. The input main shaft 1 drives the hydrostatic transmission mechanism to operate. The hydrostatic transmission mechanism converts mechanical energy into hydraulic energy and then transfers kinetic energy to the sun gear of the second planetary gear train 3. At the same time, the input main shaft 1 also drives the driven plate of the second clutch 6 through the driving plate of the second clutch 6. Further, the driven plate of the second clutch 6 transfers power to the gear ring of the second planetary gear train 3 by driving the reverse gear 8. Then, the power input of the gear ring of the second planetary gear train 3 and the power input of the sun gear of the second planetary gear train 3 are uniformly transferred to the planetary carrier of the second planetary gear train 3, then transferred to the planetary carrier of the first planetary gear train 2 through the planetary carrier of the second planetary gear train 3, and then transferred to the sun gear of the third planetary gear train 4. Further, the sun gear of the third planetary gear train 4 drives the driving plate of the fourth clutch 11 to rotate through the transmission gear. The driving plate of the fourth clutch 11 drives the driven plate of the meshed fourth clutch 11 to rotate. Finally, the output main shaft 9 is driven to rotate. In this manner, the power output of second reverse gear ratio is implemented.

In a first forward gear ratio state, the brake 7 and the fourth clutch 11 are closed, and the first clutch 5, the second clutch 6, and the third clutch 10 are disengaged. The input main shaft 1 drives the hydrostatic transmission mechanism to operate. The hydrostatic transmission mechanism converts mechanical energy into hydraulic energy, then transfers kinetic energy to the sun gear of the first planetary gear train 2, and then transfers the kinetic energy to the sun gear of the third planetary gear train 4 through the planetary carrier of the first planetary gear train 2. Further, the sun gear of the third planetary gear train 4 drives the driving plate of the fourth clutch 11 to rotate by gear transmission. The driving plate of the fourth clutch 11 drives the driven plate of the meshed fourth clutch 11 to rotate. Finally, the output main shaft 9 is driven to rotate. In this manner, the power output of the first forward gear ratio is implemented.

In a second forward gear ratio state, the first clutch 5 and the fourth clutch 11 are closed, and the second clutch 6, the brake 7, and the third clutch 10 are disengaged. At this time, the first planetary gear train 2 has two degrees of freedom, that is, in an idle state. The input main shaft 1 drives the hydrostatic transmission mechanism to operate. The hydrostatic transmission mechanism converts mechanical energy into hydraulic energy and then transfers kinetic energy to the sun gear of the second planetary gear train 3. At the same time, the input main shaft 1 also drives the driven plate of the first clutch 5 through the driving plate of the first clutch 5. Further, the driven plate of the first clutch 5 transfers power to the gear ring of the second planetary gear train 3 through the transmission gear. Then, the power input of the gear ring of the second planetary gear train 3 and the power input of the sun gear of the second planetary gear train 3 are uniformly transferred to the planetary carrier of the second planetary gear train 3, then transferred to the planetary carrier of the first planetary gear train 2 through the planetary carrier of the second planetary gear train 3, and then transferred to the sun gear of the third planetary gear train 4. The sun gear of the third planetary gear train 4 drives the driving plate of the fourth clutch 11 to rotate by gear transmission. The driving plate of the fourth clutch 11 drives the driven plate of the meshed fourth clutch 11 to rotate. Finally, the output main shaft 9 is driven to rotate. In this manner, the power output of the second forward gear ratio is implemented. In the second forward gear ratio state, the first planetary gear train 2 and the third planetary gear train 4 do not perform power output, and the second planetary gear train 3 performs power output.

In a third forward gear ratio state, the first clutch 5 and the third clutch 10 are closed, and the second clutch 6, the brake 7, and the fourth clutch 11 are disengaged. The input main shaft 1 drives the hydrostatic transmission mechanism to operate. The hydrostatic transmission mechanism converts mechanical energy into hydraulic energy and then transfers kinetic energy to the sun gear of the second planetary gear train 3. At the same time, the input main shaft 1 also drives the driven plate of the first clutch 5 through the driving plate of the first clutch 5. Further, the driven plate of the first clutch 5 transfers power to the gear ring of the second planetary gear train 3 through the transmission gear. Then, the power input of the gear ring of the second planetary gear train 3 and the power input of the sun gear of the second planetary gear train 3 are uniformly transferred to the planetary carrier of the second planetary gear train 3, then transferred to the planetary carrier of the first planetary gear train 2 through the planetary carrier of the second planetary gear train 3, and then transferred to the sun gear of the third planetary gear train 4. At the same time, since the planetary carrier of the third planetary gear train 4 is in transmission connection to the gear of the input main shaft 1, the input main shaft 1 transmits power to the planetary carrier of the third planetary gear train 4. At this time, the third clutch 10 is closed, and the fourth clutch 11 is disengaged. Further, the power input of the planetary carrier of the third planetary gear train 4 and the power input of the sun gear of the third planetary gear train 4 are uniformly transferred to the gear ring of the third planetary gear train 4. The gear ring of the third planetary gear train 4 transfers power to the driving plate of the third clutch 10 through the transmission gear. The driving plate of the third clutch 10 drives the driven plate of the third clutch 10. Further, the driven plate of the third clutch 10 drives the output main shaft 9 to rotate. In this manner, the power output of the third forward gear ratio is implemented.

The advantages of the power split transmission system of this embodiment are below.
  1. In the second forward gear ratio state, the first clutch 5 and the fourth clutch 11 are closed. In the third forward gear ratio state, the first clutch 5 and the third clutch 10 are closed. Further, during the process of shifting from the second forward gear ratio to the third forward gear ratio, only the fourth clutch 11 needs to be disengaged, and the third clutch 10 is closed. In one aspect, this process does not change the power input of the hydrostatic transmission mechanism to the sun gear of the second planetary gear train 3 and the power input of the input main shaft 1 to the gear ring of the second planetary gear train 3 through the first clutch 5. At the same time, the input main shaft 1 further provides power input to the planetary carrier of the third planetary gear train 4 and then cooperates with the power transferred by the planetary carrier of the second planetary gear train 3 to jointly drive the gear ring of the third planetary gear train 4 to rotate. Finally, the power output to the output main shaft 9 is completed through the close of the third clutch 10. Since the input main shaft 1 provides additional power input to the planetary carrier of the third planetary gear train 4 in the third forward gear ratio state, the demand for the power input of the hydrostatic transmission mechanism is reduced. In this manner, the problem that the range of the swinging range of a hydraulic pump in the hydrostatic transmission mechanism is excessively large is solved, thereby reducing gear shift time. Finally, the overall performance is improved.

2. In the a first forward gear ratio state, the brake 7 and the fourth clutch 11 are closed, so that transmission can be provided only by the hydrostatic transmission mechanism, and large output torque can be provided.

3. Compared with the existing transmission system in which double planetary gear trains cooperate with a hydrostatic transmission mechanism, in this embodiment, three sets of planetary gear rows and the hydrostatic transmission mechanism are applied to the transmission of a gearbox, so that not only a large speed adjustment range can be implemented, but also the transmission dependence on the hydrostatic transmission mechanism is reduced, thereby reducing gear shift time.

In addition, as shown in FIG. 1, for the specific structure of the hydrostatic transmission mechanism, the hydrostatic transmission mechanism mainly includes an existing hydraulic pump 12 and a constant displacement motor 13. The input terminal of the hydraulic pump 12 is coaxially fixed to a first gear 14. The input main shaft 1 is coaxially fixed to a second gear 15. The second gear 15 meshes with the first gear 14. In this manner, the kinetic energy of the input main shaft 1 is transferred to the input terminal of the hydraulic pump 12. The input terminal of the constant displacement motor 13 is in transmission connection to the output terminal of the hydraulic pump 12 by hydraulic pressure. The output terminal of the constant displacement motor 13 is coaxially connected to a third gear 16. Each of the sun gear of the first planetary gear train 2 and the sun gear of the second planetary gear train 3 is coaxially fixed to a first sun gear axle 17. The first sun gear axle 17 is coaxially fixed to a fourth gear 18. The fourth gear 18 meshes with and is in transmission connection to the third gear 16 through a transition gear set (not shown). In this manner, the kinetic energy at the output terminal of the constant displacement motor 13 is transferred to the sun gear of the first planetary gear train 2 and the sun gear of the second planetary gear train 3.

For the transmission connection structure of the fourth clutch 11 and the sun gear of the third planetary gear train 4, as shown in FIG. 1, the sun gear of the third planetary gear train 4 is coaxially fixed to a second sun gear axle 23. A first terminal of the second sun gear axle 23 is coaxially fixed to the planetary carrier of the first planetary gear train 2. A second terminal of the second sun gear axle 23 is coaxially fixed to a ninth gear 24. A tenth gear 25 coaxially fixed to the driving plate of the fourth clutch 11 sleeves on the output main shaft 9. The tenth gear 25 meshes with the ninth gear 24. In this manner, the transmission connection of the fourth clutch 11 to the sun gear of the third planetary gear train 4 is implemented.

Similarly, for the transmission connection structure of the third clutch 10 and the gear ring of the third planetary gear train 4, as shown in FIG. 1, an eleventh gear 26 coaxially fixed to the gear ring of the third planetary gear train 4 sleeves on the second sun gear axle 23. A twelfth gear 27 coaxially fixed to the driving plate of the third clutch 10 sleeves on the output main shaft 9. The twelfth gear 27 meshes with the eleventh gear 26. In this manner, the transmission connection of the third clutch 10 to the gear ring of the third planetary gear train 4 is implemented.

In addition, for the transmission connection structure of the input main shaft 1 and the planetary carrier of the third planetary gear train 4, as shown in FIG. 1, the input main shaft 1 is coaxially fixed to a thirteenth gear 28. A fourteenth gear 29 coaxially fixed to the planetary carrier of the third planetary gear train 4 sleeves on the second sun gear axle 23. The thirteenth gear 28 meshes with the fourteenth gear 29. In this manner, the transmission connection of the input main shaft 1 to the planetary carrier of the third planetary gear train 4 is implemented.

What is claimed is:

1. A power split transmission system, comprising:
   a hydrostatic transmission mechanism;
   an input main shaft in transmission connection to an input terminal of the hydrostatic transmission mechanism;
   a first planetary gear train, a second planetary gear train, and a third planetary gear train, wherein an output terminal of the hydrostatic transmission mechanism is in driving connection to a sun gear of the first planetary gear train and a sun gear of the second planetary gear train, a planetary carrier of the first planetary gear train is coaxially fixed to a planetary carrier of the second planetary gear train, the planetary carrier of the first planetary gear train is coaxially fixed to a sun gear of the third planetary gear train, and a planetary carrier of the third planetary gear train is in transmission connection to a gear of the input main shaft;
   a reverse gear, a first clutch, a second clutch, and a brake, wherein the first clutch is configured to make the input main shaft in transmission connection to a gear ring of the second planetary gear train to drive the gear ring of the second planetary gear train to rotate forward, the second clutch is configured to make the input main shaft in transmission connection to the gear ring of the second planetary gear train through the reverse gear to drive the gear ring of the second planetary gear train to rotate reversely, and the brake is connected to a gear ring of the first planetary gear train to control locking of the gear ring of the first planetary gear train; and
   an output main shaft, a third clutch, and a fourth clutch, wherein a driving plate of the third clutch is in transmission connection to a gear ring of the third planetary gear train, a driving plate of the fourth clutch is in transmission connection to the sun gear of the third planetary gear train, and each of a driven plate of the third clutch and a driven plate of the fourth clutch is coaxially fixed to the output main shaft.

2. The power split transmission system according to claim 1, wherein the hydrostatic transmission mechanism comprises:
   a hydraulic pump, wherein a first gear is coaxially fixed on an input terminal of the hydraulic pump, a second gear is coaxially fixed on the input main shaft, and the second gear meshes with the first gear; and
   a constant displacement motor, wherein an input terminal of the constant displacement motor is in transmission connection to an output terminal of the hydraulic pump by hydraulic pressure, the output terminal of the constant displacement motor is coaxially connected to a third gear, each of the sun gear of the first planetary gear train and the sun gear of the second planetary gear train is coaxially fixed to a first sun gear axle, a fourth gear is coaxially fixed on the first sun gear axle, and the fourth gear is in transmission connection to the third gear through a transition gear set.

3. The power split transmission system according to claim 1, wherein a driving plate of the first clutch is coaxially fixed to the input main shaft, a driven plate of the first clutch coaxially sleeves on the input main shaft, the driven plate of the first clutch is coaxially fixed to a fifth gear, the gear ring of the second planetary gear train is coaxially fixed to a sixth gear, and the sixth gear meshes with the fifth gear.

4. The power split transmission system according to claim 1, wherein a driving plate of the second clutch is coaxially fixed on the input main shaft, a driven plate of the second clutch coaxially sleeves on the input main shaft, the driven plate of the second clutch is coaxially fixed to a seventh gear, the gear ring of the second planetary gear train is coaxially fixed to an eighth gear, and the seventh gear is in transmission connection to the eighth gear through the reverse gear.

5. The power split transmission system according to claim 1, wherein a driving plate of the brake is coaxially fixed to the gear ring of the first planetary gear train, and a driven plate of the brake is fixed to a brake holder to limit a rotation of the gear ring of the first planetary gear train when the driving plate of the brake and the driven plate of the brake are closed.

6. The power split transmission system according to claim 1, further comprising a second sun gear axle, wherein the sun gear of the third planetary gear train is coaxially fixed to the second sun gear axle, a first terminal of the second sun gear axle is coaxially fixed to the planetary carrier of the first planetary gear train, the second sun gear axle is coaxially fixed to a ninth gear, a tenth gear coaxially fixed to the driving plate of the fourth clutch sleeves on the output main shaft, and the tenth gear is in transmission connection to the ninth gear.

7. The power split transmission system according to claim 6, wherein an eleventh gear coaxially fixed to the gear ring of the third planetary gear train sleeves on the second sun gear axle, a twelfth gear coaxially fixed to the driving plate of the third clutch sleeves on the output main shaft, and the twelfth gear meshes with the eleventh gear.

8. The power split transmission system according to claim 6, wherein a thirteenth gear is coaxially fixed to the input main shaft, a fourteenth gear coaxially fixed to the planetary carrier of the third planetary gear train sleeves on the second sun gear axle, and the thirteenth gear is in transmission connection to the fourteenth gear.

9. The power split transmission system according to claim 1, wherein the first planetary gear train, the second planetary gear train, and the third planetary gear train are coaxially arranged side by side, and the first planetary gear train is located between the second planetary gear train and the third planetary gear train.

* * * * *